(12) United States Patent
Wang

(10) Patent No.: US 7,868,785 B1
(45) Date of Patent: Jan. 11, 2011

(54) OWNSHIP SYMBOL FOR ENHANCED SITUATION AWARENESS

(75) Inventor: Yifei Wang, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 295 days.

(21) Appl. No.: 12/231,250

(22) Filed: Aug. 29, 2008

(51) Int. Cl.
- G01C 21/00 (2006.01)
- G01C 23/00 (2006.01)
- G08G 1/123 (2006.01)
- G06F 3/048 (2006.01)

(52) U.S. Cl. .......... 340/972; 340/977; 340/995.14; 340/995.17; 715/846

(58) Field of Classification Search ......... 340/945–980, 340/995.1–995.28
See application file for complete search history.

(56) References Cited

U.S. PATENT DOCUMENTS 6,054,937 A * 4/2000 Von Viebahn et al. ....... 340/961
2003/0193411 A1 * 10/2003 Price ......................... 340/973
2007/0241935 A1 * 10/2007 Pepitone et al. ............ 340/958
2008/0281512 A1 * 11/2008 Wipplinger et al. ......... 701/208
2010/0026525 A1 * 2/2010 Feyereisen et al. .......... 340/972

* cited by examiner

*Primary Examiner*—Benjamin C Lee
*Assistant Examiner*—Michael Shannon
(74) *Attorney, Agent, or Firm*—Matthew J. Evans; Daniel M. Barbieri

(57) ABSTRACT

A method of symbolically representing a location of an aircraft on a display in the aircraft is disclosed. It is determined whether the aircraft is operating proximal one of a runway and a taxi-way. A range of the display is selected. Features are displayed near a location of the aircraft on the display at a first scale that corresponds to the selected range. A first symbol representing a current location of the aircraft is displayed on the display at the first scale in solid form. A second symbol representing the current location of the aircraft is displayed on the display at a second scale in non-solid form when a size of the first symbol representing the aircraft at the first scale obscures the displayed features on the display. The size of the first symbol is smaller than a size of the second symbol.

19 Claims, 6 Drawing Sheets

OWNSHIP SYMBOL FOR ENHANCED SITUATION AWARENESS

FIELD OF THE INVENTION

The present invention relates generally to the field of aviation, and more particularly, to aircraft-based displays.

BACKGROUND OF THE INVENTION

Avionics displays efficiently provide a vast amount of data to an aircraft pilot in a form that is intuitive and easy to understand. Among the data provided to a pilot is the aircraft's position relative to terrain, weather events and other hazards, and man-made features such as runways and terminals. Such position data can be easily provided in a graphical or map-based form, and most avionics systems currently provide such a graphical rendering of an aircraft's relative position. Key to such relative position information is the displayed symbol representative of the aircraft's position. This ownship symbol must be quickly locatable on a display. Traditionally this has been ensured by centering the ownship symbol in the map-based display and/or rendering the ownship symbol in a color that readily contrasts with other displayed colors, such as magenta or bright green. Another way of ensuring easy location of the ownship signal is to make the symbol a constant size regardless of the scale of the map-based display with which it is displayed. Although the ownship symbol greatly overstates the size of the airplane relative to the display scale, the strategy works well for in-air applications where the ownship symbol is not likely to obscure the display of nearby hazards, and where the locations of nearby hazards are not an immediate threat to safely operating the aircraft.

There are certain situations in which the fixed-size ownship symbol may not be an optimal method of displaying the location of an aircraft. Specifically, operations of an aircraft on or near the ground, such as during taxiing, take-off, approach, and landing, present a different set of challenges. Ground or surface operations place an aircraft in much closer proximity to other vehicles and structures, and the separation between other aircraft in particular is smaller. Aircraft generally have a much more restricted movement area and there is therefore a much smaller tolerance for error in movement. A fixed-size ownship symbol that overstates the size of the aircraft on the display obscures important surface traffic or obstacles that are immediately near the aircraft. Even if the ownship symbol were provided in outline form to minimize such obfuscation of nearby objects, a fixed-size ownship symbol provides potentially misleading situation awareness information with regard to separation from proximal structures and objects.

It is therefore an object of the invention to improve the situational awareness of a pilot of an aircraft by providing accurate information relative to the scale of an aircraft on an aircraft-based display.

Another object of the invention is to minimize the displayed obfuscation of hazards and traffic near an aircraft.

It is another object of the invention is to provide accurate separation information between an aircraft and nearby objects.

A feature of the invention is the simultaneous display of a fixed-size ownship symbol and an ownship symbol conformal to the scale of the rendered display during surface or ground-based aircraft operation.

An advantage of the invention is increased situational awareness during surface or ground-based aircraft operation.

SUMMARY OF THE INVENTION

The invention provides a method of symbolically representing a location of an aircraft on a display in the aircraft. It is determined whether the aircraft is operating proximal one of a runway and a taxi-way. A range of the display is selected. Features are displayed near a location of the aircraft on the display at a first scale that corresponds to the selected range. A first symbol representing a current location of the aircraft is displayed on the display at the first scale in solid form. A second symbol representing the current location of the aircraft is displayed on the display at a second scale in non-solid form when a size of the first symbol representing the aircraft at the first scale obscures the displayed features on the display. The size of the first symbol is smaller than a size of the second symbol.

The invention also provides a method of symbolically representing a location of an aircraft on a display in the aircraft. It is determined whether the aircraft is operating in a ground mode. A range of the display is selected. Features near a location of the aircraft are displayed on the display according to a first scale that corresponds to the selected range. When the aircraft is operating in the ground mode, a first portion of an ownship symbol rendered at a constant size is displayed on the display in outline form. The ownship symbol has a second portion rendered according to the first scale in solid form when the constant size of the first portion obscures the displayed features on the display. The constant size of the first portion is at least as large as a size of the second portion.

The invention further provides a method of displaying a position of an aircraft on a display in the aircraft. A location of a feature proximal the aircraft is determined. The feature is displayed according to a first scale on the display. When the aircraft is operating in a ground mode, an ownship symbol representing the position of the aircraft is displayed in solid form and at a constant size when the ownship symbol does not obscure the displayed feature. The ownship symbol is simultaneously displayed in a first, solid form rendered conformal with the first scale, and a second, outline form rendered at the constant size, when the ownship symbol at a constant size obscures the displayed feature.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE DRAWINGS

Reference will now be made in detail to the presently preferred embodiments of the invention, examples of which are illustrated in the accompanying drawings. It is to be appreciated that corresponding reference numbers refer to generally corresponding structures.

Figure 1:
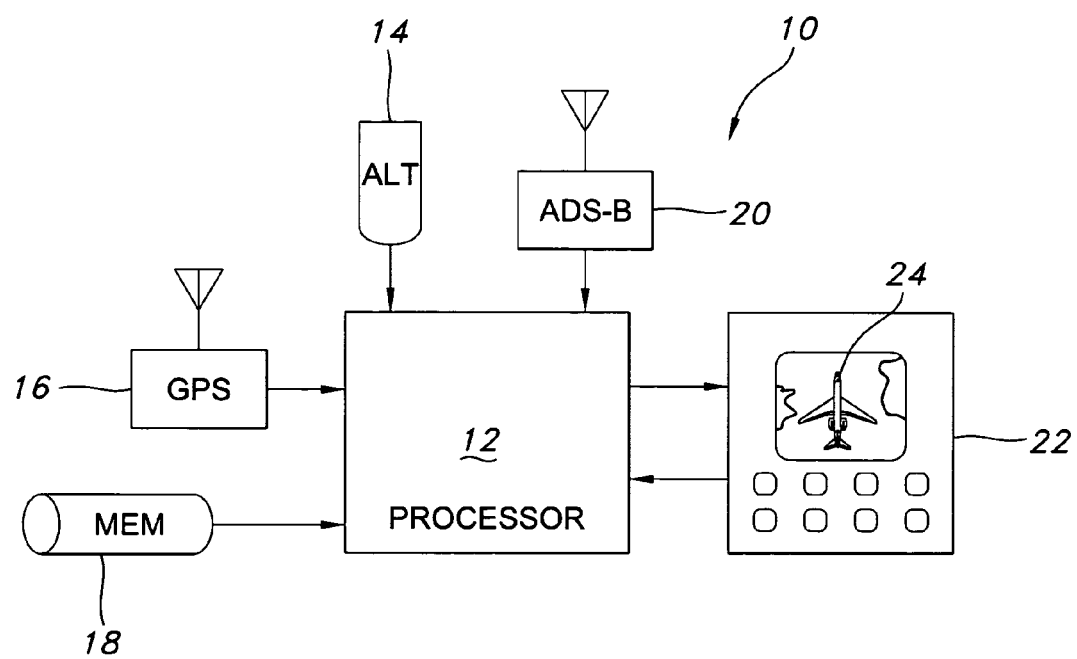
FIG. 1 is a schematic diagram of an avionics display according to the invention.

FIG. 1 depicts an avionics system 10 designed to be installed on an aircraft. System 10 includes a processor 12 that accepts inputs from various sources. For example, an altimeter 14 provides a measurement of the altitude of the aircraft. A global positioning system (GPS) engine 16 provides a precise position and velocity of the aircraft. A memory 18 contains stored information relating to the positions of known objects relevant to the aircraft's flight, such as towers, terrain topography, runways, taxiways, and terminals. An Automatic Dependent Surveillance Broadcast (ADS-B) receiver 20 provides position information for nearby aircraft. Processor 12 also accepts user inputs from a display unit 22. Outputs from the processor are sent to display unit 22 to direct the display unit to show a desired scene, such as a map used for situational awareness purposes. Processor 12 may accept inputs from other sources as well, such as weather radar (not shown), infrared sensors (not shown) and others.

Figure 2:
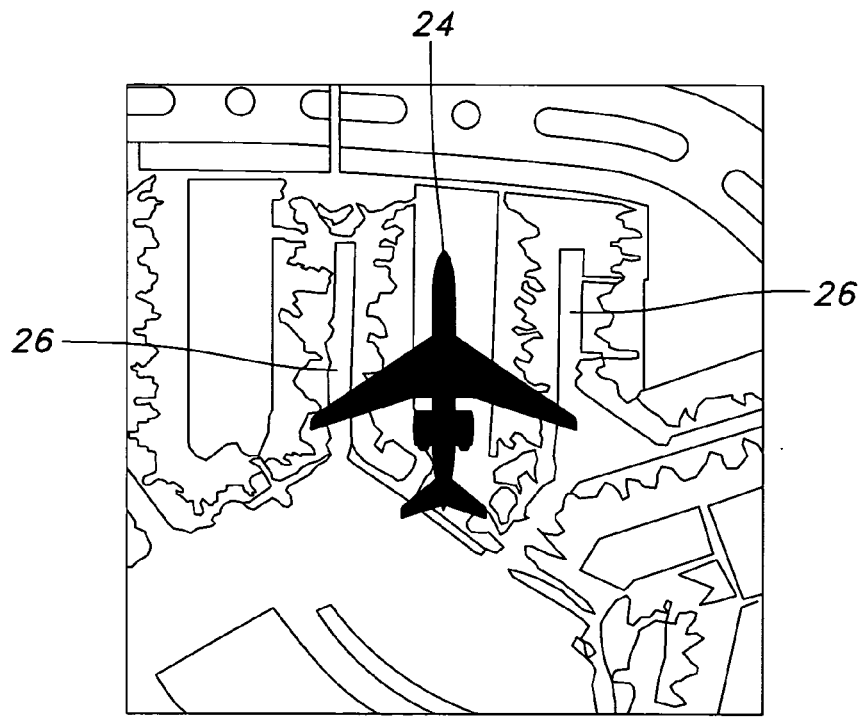
FIG. 2 is an output of a display showing an ownship symbol of a constant size.
Figure 3:
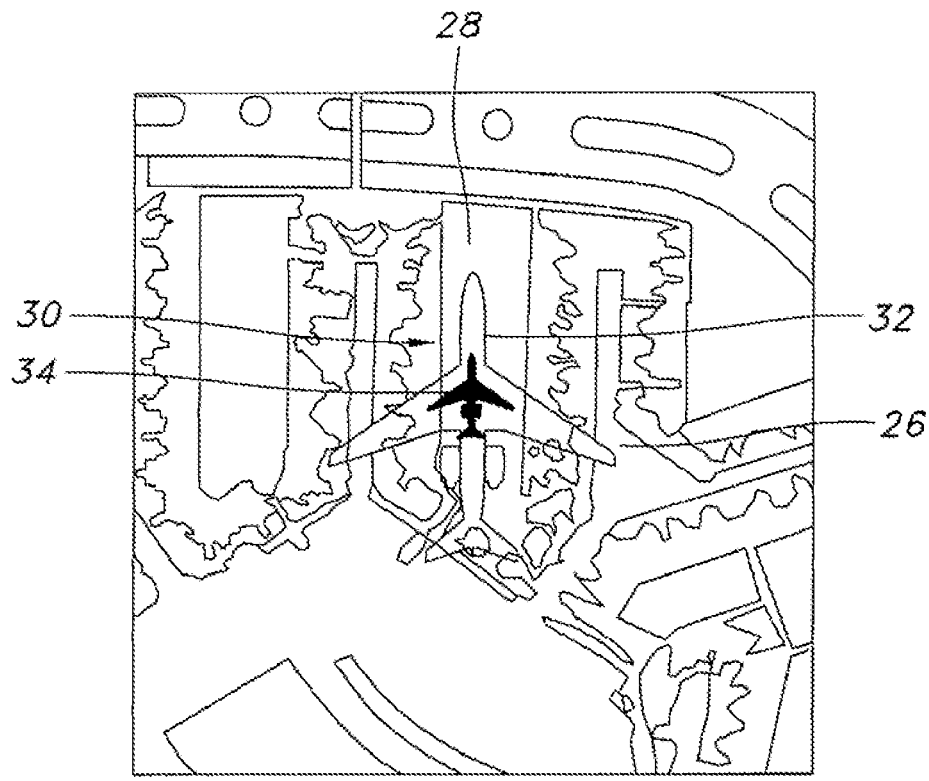
FIG. 3 is an output of a display according to the invention.
Figure 4:
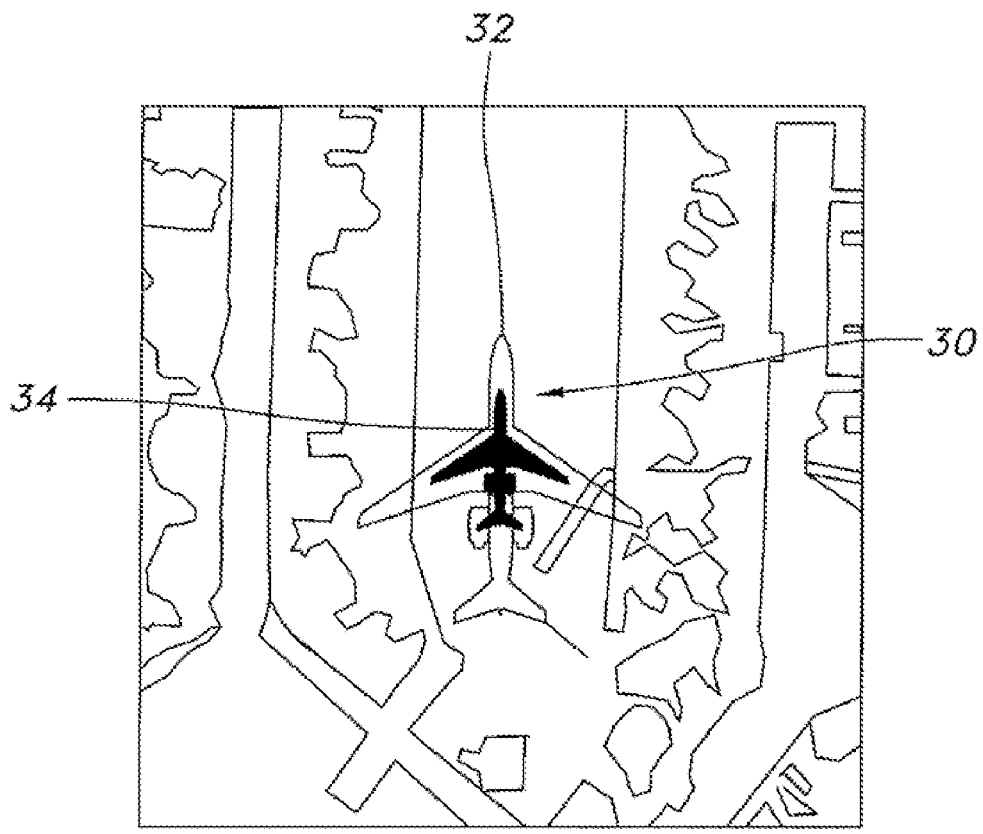
FIG. 4 is an output of a display according to the invention.
Figure 5:
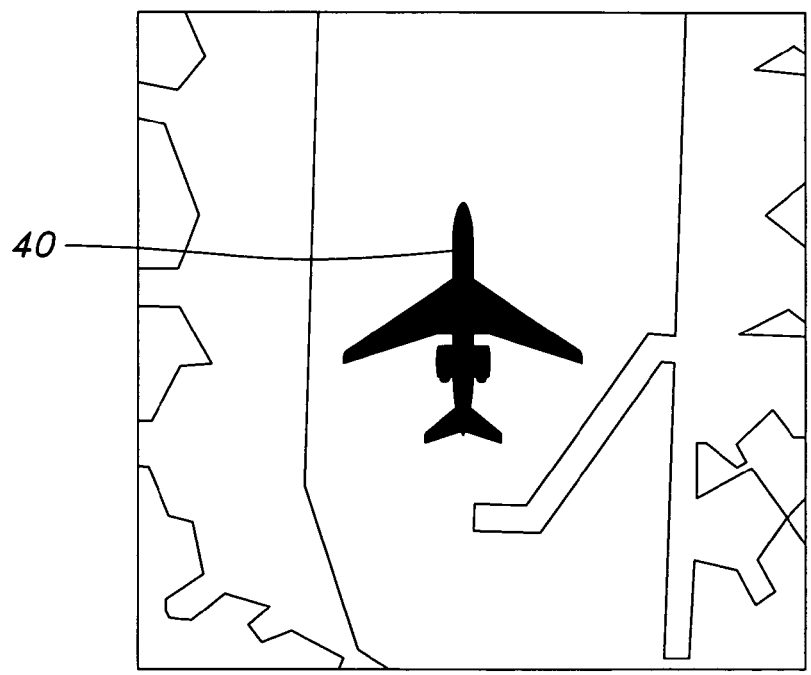
FIG. 5 is an output of a display according to the invention.

In operation, processor 12 uses the inputs from one or more of the altimeter 14, GPS engine 16, memory 18, and ADS-B receiver 20 to determine a position of the aircraft. Processor 12 also uses said inputs, as well as user inputs from display unit 22, to determine what range or scale to use when rendering a map display. For example, the map may show terrain or other features within a 150 nautical mile radius when the aircraft is at a cruising altitude, but may only show terrain or other features within a 1000 foot radius when taxiing or preparing to dock at a terminal. A user may also manually override any automatically determined range or scale calculation by providing a user input 22. Processor 12 also determines whether the aircraft is in a ground mode, which can be defined as an operating mode where the aircraft is on or near the ground during such operations as take-off, taxiing, landing, approach, and other ground-based activities. Processor 12 renders the map to be displayed at the determined or selected range or scale. Processor 12 also renders an ownship symbol 24 to represent the position of the aircraft relative to the displayed map. The size of the ownship symbol is generally designed to be constant, as determined by regulatory requirement or merely by optimum viewing efficiency. If it is determined that the aircraft is not in a ground mode, the ownship symbol is rendered on the displayed map at the constant size in a solid, readily identifiable color such as green or magenta. If it is determined that the aircraft is in a ground mode, however, it is possible that displaying the ownship symbol could mislead a pilot as to the proximity of nearby hazards such as other aircraft, terminals, or towers. This is shown in the display output depicted in FIG. 2, where an ownship symbol 24 at the constant size is displayed over parts of a terminal 26. According to the invention, then, when the aircraft is in a ground mode and when the ownship signal rendered at the constant size would overlap other features in the display output, the ownship symbol is rendered as comprising two components, as shown in FIG. 3: the first component 32 of the ownship symbol 30 is rendered at the constant size in a non-solid form such as an outline or cross-hatch form; and the second component 34 is rendered to show the aircraft in solid form according to the determined or selected range or scale at which the other map features, such as terminal 26 and taxiway 28, are rendered. In FIG. 3 it can be seen that second component 34 of ownship symbol is rendered at the same scale as terminal 26 and taxiway 28 has been rendered. As the scale of the display is changed automatically or manually to zoom in on the scene (FIG. 4), the scale used to render second component 34 of ownship symbol 30 correspondingly changes, while first component 32 remains the same size as previous renderings. Finally, when the scale of the display is changed so that the size of the ownship symbol at the constant size does not interfere or cover other parts or features of the scene, a solid ownship symbol 40 is rendered as shown in FIG. 5.

The first component 32 of the ownship symbol, which is the aircraft outline, is fixed in size and does not change size as the aircraft altitude or the map/display range changes. The aircraft outline is consistent with known currently used ownship symbols in that it is visible at all times, regardless of map scale, thereby providing a user a clear indication of the current aircraft location and orientation. On the other hand, the size of second component 34, which is the inner aircraft symbol, is conformal to the scale of the map rendered on the display, and will change size depending on the altitude or map range. In some cases the second component will be too small to see because of the determined or selected scale, but in such a circumstance the first component, i.e., the aircraft outline, is still displayed.

Figure 6:
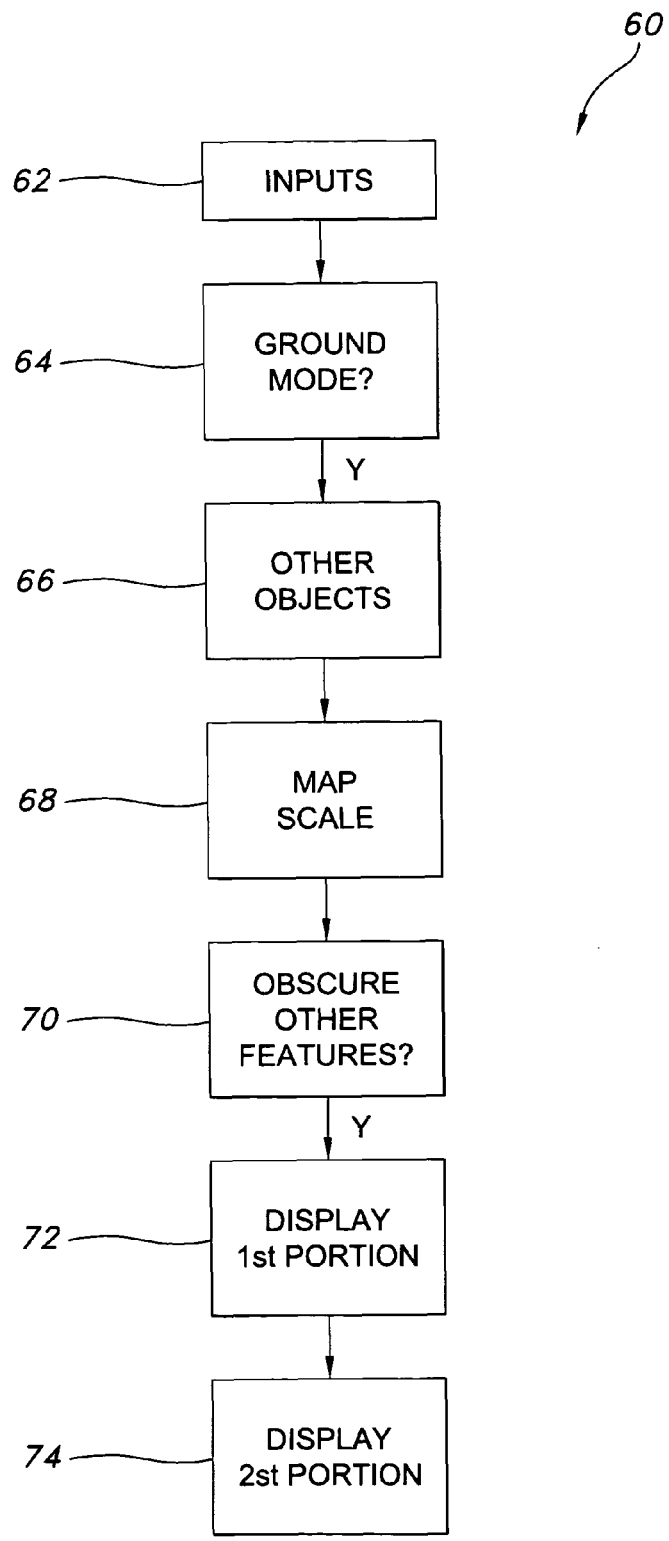
FIG. 6 is a flowchart according to a method of the invention.

FIG. 6 is a flowchart 60 showing a method according to the invention. In step 62 a processor in an avionics system receives inputs from one or more of a plurality of sources, such as an altimeter, a GPS engine, a memory, an ADS-B receiver, user selection of range and display format, and the like. In step 64 the processor determines whether the aircraft is in a ground mode, which is defined as an aircraft operating mode at or near the ground, such as taxiing, take-off, landing, approach, and other surface operations. In step 66 the processor uses the inputs to determine the location of objects or features proximal the current position of the aircraft. In step 68 the processor uses the inputs to determine a scale or range of a map to be rendered on an aircraft display. In step 70 the processor determines whether displaying an ownship symbol at a first, predetermined size would obscure or overlap objects or features on the rendered map. If so, in step 72 the processor commands a display to render a first portion or component of the ownship symbol in non-solid form at the first predetermined size. In step 74 the processor commands the display to render a second portion of the ownship symbol in solid form at a scale conformal to the scale of the displayed map.

The invention may be varied in many ways while keeping with the spirit of the invention. For example, avionics system 10 may use a wide variety of inputs to determine the positions of the aircraft, other aircraft and vehicles, terrain, natural and man-made obstacles and hazards, and other things relevant to the safe operation of the aircraft. Also, the various components of avionics system 10 can be combined in various ways. For example, processor 12, memory 18, GPS engine 16, and display unit 22 can all be combined into a single unit.

An advantage of the invention is enhanced situation awareness of the physical structure or size of an aircraft relative to other map features.

Another advantage is that clear visibility of the ownship symbol is maintained. This is especially important if the size of the ownship symbol is mandated according to airline or regulatory requirements.

Still another advantage is that the invention requires no additional hardware over what is already currently deployed in the vast majority of aircraft.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of symbolically representing a location of an aircraft on a display in the aircraft, comprising:
    determining by a processor whether the aircraft is operating proximal one of a runway and a taxi-way;
    selecting a range of the display;
    displaying features near the location of the aircraft on the display at a first scale that corresponds to the selected range;
    displaying on the display a first symbol representing the aircraft at a current location at the first scale in solid form; and
    displaying on the display a second symbol representing the aircraft at the current location at a second scale in non-solid form when the processor determines that a size of the first symbol at the first scale obscures the displayed features on the display;
    wherein the size of the first symbol is smaller than a size of the second symbol.

2. The method of claim 1, wherein the size of the second symbol is constant.

3. The method of claim 1, wherein the features include at least one of an airport terminal, a taxiway, a runway, and a vehicle.

4. The method of claim 1, further comprising displaying the first symbol at the second scale in solid form when the size of the first symbol at the first scale will not obscure the displayed features on the display.

5. The method of claim 1, wherein the range of the display is selected by an operator of the aircraft.

6. The method of claim 1, wherein the range of the display is selected based upon an altitude of the aircraft.

7. The method of claim 1, wherein the determination of whether the aircraft is operating proximal one of a runway and a taxi-way is made by evaluating an altitude of the aircraft.

8. The method of claim 1, wherein the second symbol is an outline of the aircraft.

9. A method of symbolically representing a location of an aircraft on a display in the aircraft, comprising:
    determining by a processor whether the aircraft is operating in a ground mode;
    selecting a range of the display;
    displaying features near the location of the aircraft on the display according to a first scale that corresponds to the selected range;
    when the aircraft is operating in the ground mode, displaying on the display a first portion of an ownship symbol rendered at a constant size in outline form, the ownship symbol further having a second portion rendered according to the first scale in solid form when the processor determines that the constant size of the first portion obscures the displayed features on the display;
    wherein the constant size of the first portion is at least as large as a size of the second portion.

10. The method of claim 9, wherein the displayed features include at least one of an airport terminal, a taxiway, and a vehicle.

11. The method of claim 9, further comprising displaying the first portion of the ownship symbol according to the constant size in solid form when the first portion displayed according to the constant size will not obscure the displayed features on the display.

12. The method of claim 9, wherein the range of the display is selected by an operator of the aircraft.

13. The method of claim 9, wherein the range of the display is selected based upon an altitude of the aircraft.

14. The method of claim 9, wherein the determination of whether the aircraft is operating in a ground mode is made by evaluating an altitude of the aircraft.

15. A method of displaying a position of an aircraft on a display in the aircraft, the method comprising:
    determining by a processor a location of a feature proximal the aircraft;
    displaying the feature according to a first scale on the display;
    when the aircraft is operating in a ground mode, displaying an ownship symbol representing the position of the aircraft in solid form and at a constant size when the processor determines that the ownship symbol does not obscure the displayed feature, and simultaneously displaying the ownship symbol in;
    a first, solid form rendered conformal with the first scale, and
    a second, outline form rendered at the constant size, when the processor determines that the ownship symbol at the constant size obscures the displayed feature,
    wherein the first, solid form is smaller than the second, outline form.

16. The method of claim 15, wherein the features include at least one of an airport terminal, a taxiway, and a vehicle.

17. The method of claim 15, wherein the first scale is determined based upon a user-selected display range.

18. The method of claim 15, wherein the first scale is determined based upon operating parameters of the aircraft.

19. The method of claim 15, wherein a determination by the processor of whether the aircraft is operating in a ground mode is made by evaluating an altitude of the aircraft.

* * * * *